United States Patent [19]

Garrigues et al.

[11] Patent Number: 4,653,724
[45] Date of Patent: Mar. 31, 1987

[54] UNIVERSAL TYPE BUTTERFLY VALVE AND MANUFACTURING PROCESS FOR SAME

[75] Inventors: Jean-Claude Garrigues; Patrick Guiroy, both of Ogeu les Bains, France

[73] Assignee: Applications Mecaniques et Robinetterie Industrielle, France

[21] Appl. No.: 776,002

[22] Filed: Sep. 13, 1985

[30] Foreign Application Priority Data

Sep. 27, 1984 [FR] France .................................. 84 14829

[51] Int. Cl.$^4$ ............................................. F16K 1/22
[52] U.S. Cl. .................................. 251/306; 251/152; 277/180; 277/187; 285/350; 285/363
[58] Field of Search ........................ 251/152, 306, 367; 277/180, 181, 182, 187; 285/349, 350, 363

[56] References Cited

U.S. PATENT DOCUMENTS

| | | | |
|---|---|---|---|
| 2,756,017 | 7/1956 | Silverman | 251/367 |
| 2,994,342 | 10/1976 | Stillwagon | 251/306 |
| 3,000,609 | 9/1961 | Bryant | 251/306 |
| 3,095,063 | 6/1963 | Eskanazi | 277/182 |
| 3,241,806 | 3/1966 | Snell, Jr. | 251/306 |
| 3,306,573 | 2/1967 | Trefil | 251/306 |
| 3,692,276 | 4/1974 | Conners et al. | 251/306 |
| 4,006,882 | 2/1977 | Bonafous | 251/306 |
| 4,014,511 | 3/1977 | Uno | 251/152 |
| 4,210,313 | 7/1980 | Chester | 251/306 |

*Primary Examiner*—Martin P. Schwadron
*Assistant Examiner*—Sheri M. Novack
*Attorney, Agent, or Firm*—Scully, Scott, Murphy & Presser

[57] ABSTRACT

The invention concerns a butterfly valve of a type wherein the elastomer sleeve lines the body bore, and has cheeks which fit into circular recesses provided in the two parallel radial faces of the valve, the shape of the cheeks and of the circular recesses being such that when the valve is assembled between flanges, the elastomer of the cheeks is pressed into a spare volume in the circular recesses and precludes any creep of the elastomer towards the core of the sleeve.

6 Claims, 9 Drawing Figures

UNIVERSAL TYPE BUTTERFLY VALVE AND MANUFACTURING PROCESS FOR SAME

BACKGROUND OF THE INVENTION

1. Field of the Invention

The present invention concerns a universal type butterfly valve, that is a butterfly valve that can be assembled between any of the types of flanges manufactured in compliance with currently existing international standards, namely AFNOR, DIN, ISO, ANSI, AWWA, MSS, BS, JIS standards.

2. Description of the Prior Art

Generally, a butterfly valve comprises:

- a body manufactured in one or several parts and including a central bore, two parallel radial faces in the middle of which the said bore opens and a transversal drilling at a right angle to the centerline of the said bore,
- a butterfly assembled so as to rotate inside the said body by means of at least one operating shaft inserted in the said drilling, and
- a sealing lining that cooperates with the said body and the said butterfly to ensure upstream/downstream tightness when the valve is in the closed position.

The invention more specifically concerns a butterfly valve in which the sealing lining consists in an elastomer flexible ring or sleeve, with a basically U-shaped section, the core of which lines the body bore and the lateral cheeks of which turn up against the radial faces of the body and ensure external sealing at the point where the valve is joined to the piping.

In this respect it should be noted that this type of valve is usually joined to the piping by means of two connecting flanges, each one of which features a radial face designed to be assembled tightly against a matching radial face on the valve body. To this effect, each one of these flanges displays a series of evenly laid out axial holes, through which pins or screws are inserted. Each pin or screw is threaded through a couple of matching coaxial holes on both flanges and is bolted at each end, in order to ensure both:

- external sealing through the compression of the part of the flexible ring that turns up on the radial faces of the valve, and
- mechanical coupling between the two pipe sections and the valve.

Moreover, in many types of valves, the cheeks of the sleeve partially fit into a circular recess provided in the matching faces of the body. In some valves, this recess comprises, outwards from the body bore, a radial surface axially offset from the said face, then an annular groove. In this case, at the radial surface of the recess the sleeve cheeks are slightly thicker than the depth of the recess and at their ends they are shaped as a tenon that fits into the said annular groove.

This pattern ensures that the sleeve is properly anchored to the body and at the same time restricts the compression exerted on the cheeks to suit the level of sealing desired, in the understanding that this sealing is obtained when, owing to the stress induced by bolting the pins, the radial faces of the flanges are pressed against the radial faces of the valve body.

In this type of assembly, the valve body is centered on the flanges by means of the pins or screws. To this effect, a central rib (or two lateral ribs if applicable) may be provided on the perimeter of the valve body, in which axial holes or notches are drilled, through which the pins or screws are threaded.

However, the present situation is that for the same type of valve, the inner diameter of the flanges, the angular position of the holes provided in the flanges for the pins or screws, the distance of these holes to the flange centerline and the diameter of the holes are all different according to the various standards currently in force.

These differences in flange shapes require specific ranges of valves designed to match each type of flanges, and this particularly relates to the position and size of the holes or notches through which the pins or screws must be inserted.

In addition, it appears that in butterfly valves of the type described above, the compression of the sleeve cheeks by the radial faces of the flange causes a displacement of the elastomer which results in a corresponding variation of the thickness of the core of the sleeve on which the butterfly bears. The quality of the upstream/downstream tightness of the valve, as well as the operating torque are therefore affected by this creep effect.

As a result, the use of flanges complying with different standards, and therefore with different inner diameters, results in a variation of the tightness and operating torque features of the valve, owing to the volume variation induced by the compression of the elastomer.

OBJECT OF THE INVENTION

The primary purpose of the present invention is to overcome these drawbacks. It proposes a butterfly valve similar to the one described above, except for the fact that the body of this valve has a particular perimeter configuration such that it can be assembled and centered between different types of flanges with variable inner diameter, and can be provided with fastening holes with different diameters laid out in different locations, to comply with any one of the standards mentioned above. Moreover, the circular recesses provided in the radial faces of the body of this valve, as well as the sleeve cheeks designed to fit into these recesses, are given a particular shape designed to suppress the influence of the inner diameter of the flange on the valve's tightness and torque characteristics.

SUMMARY OF THE INVENTION

In application of the first feature of the invention, the above mentioned recesses provided on the radial faces of the valve successively comprise a flared section with an incurved profile that prolongs the body bore, a receding section, basically conical in shape, and then an annular groove, extending axially into the body, the inner side of which continues the receding section, whilst the outer side comes to a end at the level of the said radial face.

In this case, the inner shape of the sleeve cheek basically matches the shape of the recess, however its outer diameter is smaller than the diameter of the outer side of the annular groove, and as a result between the said cheek and the said outer side there is a spare annular volume; opposite the flared section described above, the outer side of the cheek features a flat surface basically located in the plane of the radial face, and opposite both the receding section and the groove mentioned above, a bulge tangent to a radial plane with an axial outward offset from the radial face plane.

As a result, when the pins are tightly assembled, the bulge on the sleeve cheeks is compressed by the radial faces of the pipe flanges until the latter abut against the valve face. These bulges are then flattened against the radial faces of the flanges, and therefore in the plane of the valve's radial faces. In the course of this action, the compression of the bulge causes the displacement of the elastomer of the cheeks, which is channelled by the receding section of the recess towards the annular groove, and tends to fill the spare volume, while the restriction occurring at the tip of the flared section precludes any creep of the elastomer towards the sleeve core.

It should be pointed out that the diameter at the junction between the flat outer face and the bulge on the cheeks is designed greater than the maximum inner diameter of all the different types of flanges, in order to ensure proper compression of the bulges on the cheeks.

On the other hand, the diameter of the above mentioned outer side of the circular groove is designed smaller than the minimum outer diameter of the parts of the radial faces of the flanges that compress the said cheeks, so that these parts always abut against the radial face of the valve body.

Regarding the problem raised by the centering of the valve between flanges and dismounting downstream piping at operating pressure, the invention is based on the observation that there is a measure of correspondence between the positions of the holes provided for pins or screws on the different types of flanges as per the aforementioned standards, and therefore it is possible to classify them in sets of fastening hole locations. On the other hand, it appears that the projections on a radial plane of the drillings of each set of holes are clustered together in well-defined zones, distinct from the cluster zones of other sets.

Consequently the invention proposes a valve of the type described above, the body of which is designed so that it can be assembled between any one of all the types of flanges mentioned above, and so that downstream piping can be dismounted under maximum operating pressure at all unions, all with minimum size and weight.

The body of the butterfly valve designed in application of the invention features at least two bosses on its perimeter that protrude into the passage area of a set of pins or screws matching different types of flanges, whereas the cross-section of these bosses in a radial plane of the valve is such that it contains exclusively the zone for the passage of the said set of pins or screws, so that it is possible to drill a hole in these bosses in the passage volume of a pin or a screw belonging to this set, and whereas the number of the said bosses is defined on the basis of the nominal diameter of the valve and maximum permissible pressure.

BRIEF DESCRIPTION OF THE DRAWINGS

A particular implementation of the invention will be described hereunder, as a non restrictive example, with reference to the attached drawings, wherein.

DESCRIPTION OF THE PREFERRED EMBODIMENT

Figures 1, 3:
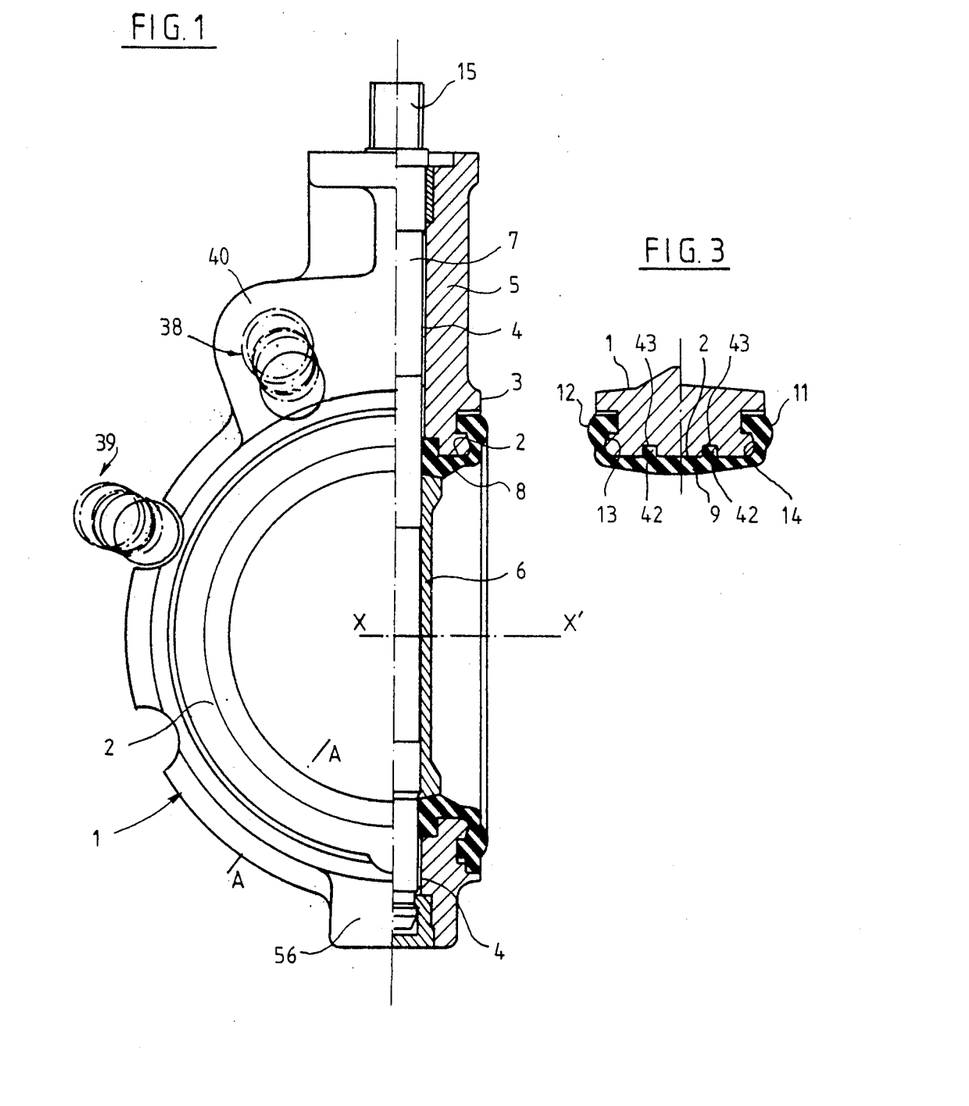
FIG. 1 shows a butterfly valve designed according to the invention, with a partial axial cut-away (right-hand side of picture) and a partial front view (left-hand side of picture)
FIG. 3 is a cross-section through A—A of the valve shown in FIG. 1.
Figure 2:
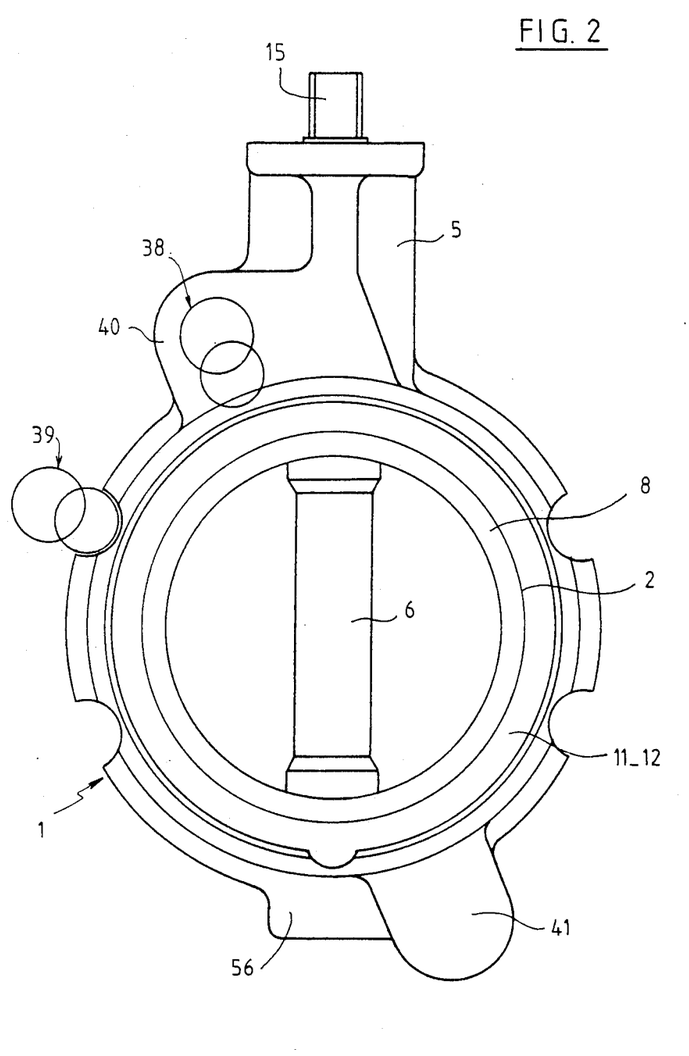
FIG. 2 is a full front view of the valve shown in FIG. 1.

As shown in FIGS. 1 and 2, the butterfly valve is conventionally composed of:

As shown in FIGS. 1 and 2, the butterfly valve is conventionally composed of:

a body 1 with a cylindrical central bore 2, two parallel radial faces 3, in the center of which opens the said bore 2, and a transversal drilling 4 at a right angle to centerline XX' of the said bore 2 and prolonged, at one end, inside radial neck 5 which is of a block with said body 1, a closing device 6, assembled to be able to rotate inside bore 2 by means of at least an operating shaft 7, which is inserted in said drilling 4, and a sealing lining consisting in an elastomer flexible ring or sleeve 8 with a basically U-shaped section, the core 9 of which lines the bore 2 of body 1 (FIG. 3) and the lateral cheeks 11, 12 of which turn up in the circular recesses 13, 14 respectively provided for in the radial faces 3 of the body 1.

The general operating principle of this type of valve is well known and therefore the present description will not go into any details thereof. However, it should simply be pointed out that this valve is operated by a quarter-turn rotation of the closing device 6 under the effect of an action exerted on the end 15 of the operating shaft 7 protruding beyond neck 5.

Likewise, the general principle of the assembly of this type of valve between flanges is well known and will not be discussed either.

Let it simply be pointed out in this connection that these flanges comprise at least one radial face designed to be applied against the radial faces 3 of the valve and axial holes drilled around their perimeter with a view to ensuring a mechanical bond between the flanges by means of bolted pins or screws. The valve is assembled on a pipe by placing the valve between the two flanges assembled on the matching ends of the pipes, inserting the pins or screws in the matching pairs of holes in both flanges, then screwing the nuts or screws so that the radial faces of both flanges are applied to the matching radial faces 3 of the valve, compressing the cheeks 11, 12 of the sleeve 8 and, as a result, ensuring tightness at both connections.

In this respect it should be noted that the radial face of the flanges may be flat or even be stepped, with a raised face designed to come into contact with the face of the valve.

As mentioned above, in the first place the invention proposes a series of arrangements related to the shape of the circular recesses 13, 14 provided on the radial faces 3 of the valve, and of the cheeks 11, 12 of sleeve 8, designed to enable the use of different types of flanges with the same valve, without any impairment of the tightness and torque characteristics of the valve.

Figure 4:
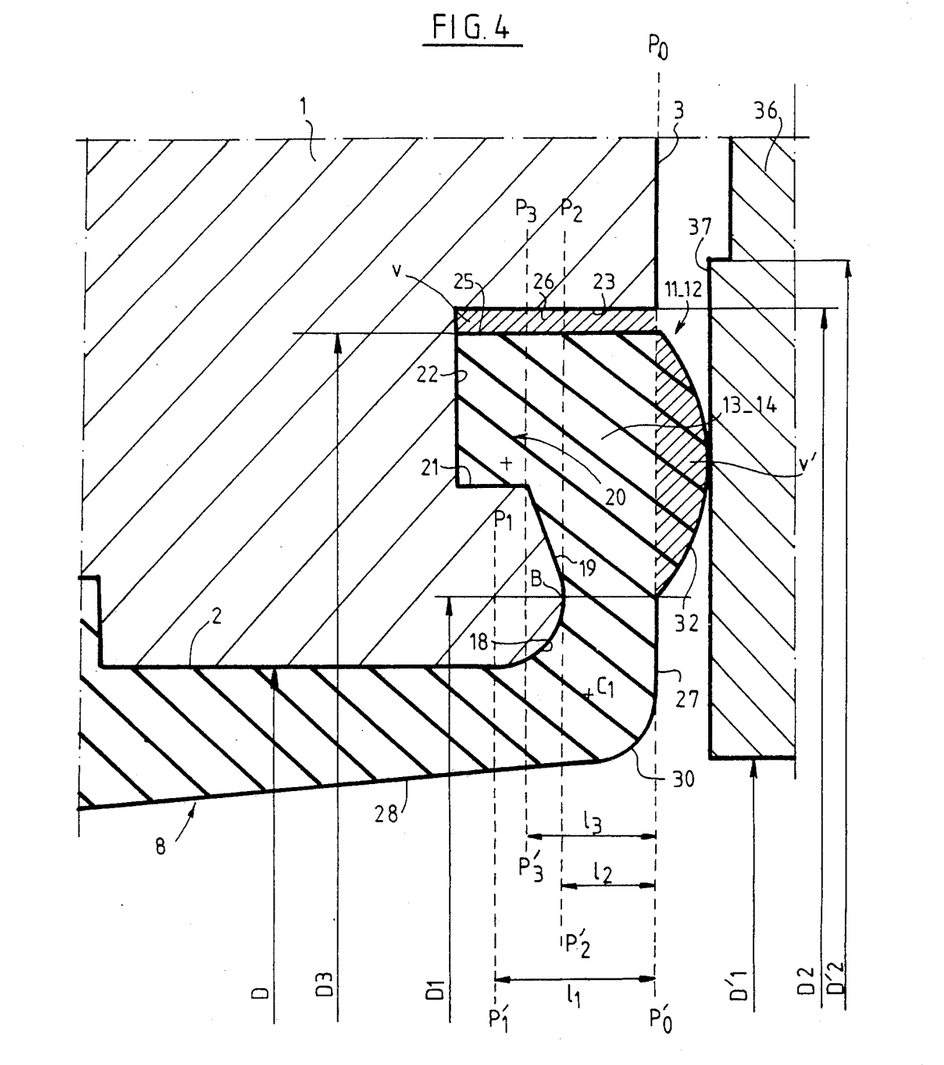
FIG. 4 is an axial cross-section at a larger scale of a detail of FIG. 1, illustrating the principle of the seal at the butterfly valve flanges.

This series of arrangements, more specifically illustrated in FIG. 4, provides for a recess 13, 14 on each radial face 3 of the valve, which comprises successively:

a first section 18 with an incurved profile that is the continuation of the bore 2 of body 1 as from a first radial plane $P_1$, $P'_1$ which passes inside the body at a distnce $l_1$ from face 3 of the valve (plane $P_0$, $P'_0$), until (point B) a second radial plane $P_2$, $P'_2$ located at a distance $l_2$, smaller than distance $l_1$, whereas the diameter $D_1$ of the end of this first section 18 is greater than the diameter D of bore 2 of body 1, a second section 19, basically conical, receding towards the body 1 and ending at a third radial plane $P_3$, $P'_3$ located at a distance $l_3$ from radial face 3 (plane $P_0$, $P'_0$) greater than distance $l_2$, and a third section forming an annular groove 20, extending axially towards the inside of the body, this groove 20 featuring successively: an inner cylindrical side 21 which is a continuation of the second section 19, a groove bottom 22 axially closer to the center of the body 1 and an outer cylindrical side 23 with diameter $D_2$ greater than diameter $D_1$.

This series of arrangements also involves a lining sleeve 8 the cheeks of which 11, 12 each feature an inner shape basically matching that of the recess 13, 14 in which it is partially housed, and an external diameter $D_3$ basically smaller than diameter $D_2$ of the outer side 23 of groove 20, such that at rest, between the said outer side 23 of groove 20 and the outer edge 25 of cheek 11, 12, there remains a spare annular volume 26 with volume v.

Moreover, these cheeks 11, 12 both feature an outer shape comprising, as from the inside surface of the sleeve:

a radial face 27 located in the plane $P_0$, $P'_0$ of radial face 3 and extending from the inner surface 28 of the core 9 of sleeve 8 until diameter $D_1$, whereas the junction of this radial face 27 and the inner surface 28 of sleeve 8 is ensured by a portion with an incurved profile 30 with curve center $C_1$;

a bulge 32 located opposite the second section 19 and the groove 20 in the recess 13, 14, and ending at the outer edge 25 of cheek 11, 12.

More specifically, this bulge 32 protrudes axially beyond plane $P_0$, $P'_0$ of radial face 3 and as from the said plane $P_0$, $P'_0$ its volume v' is basically equal to the spare volume v. As a result, when the flanges are tightened against the valve body, radial faces 37 flatten the bulge 32 towards matching planes $P_0$, $P'_0$ and cause a transfer of the cheek elastomer which creeps to fill the spare volume v. Therefore, the shape of the recesses 13, 14 and of the cheeks 11, 12 of sleeve 8 has been more specifically designed to channel the creep of the elastomer from volume v' into volume v, and to preclude any transfer of matter into the body of the valve (particularly towards core 9 of sleeve 8) such as might interfere with the tightness and the torque of the valve.

To this effect, the slope of the second (basically conical) section 19 of recess 13, 14 referred to the centerline of the bore is best comprised between 10° and 40°.

Diameter $D_1$ of the base of this second section 19, where the bulge 32 on cheek 11, 12 begins, is preferably designed at least equal to the greatest inner diameter $D'_1$ of the flanges that are liable to be used for the same valve.

On the other hand, the part of cheeks 11, 12 of sleeve 8 that fits into the annular grooves 20 acts as a tenon to anchor the sleeve 8 on the body 1 of the valve, in order to oppose any internal depression in the valve, e.g. due to operation at a pressure below atmospheric pressure and/or a depression generated by the flow of the fluid conveyed inside the valve.

The rounded shape 18 provided for at the junction between the recess 13, 14 and the bore 2 is designed to prevent any tear due to strain in sleeve 8 (traction, compression).

In the example shown in FIG. 4, the flange 36, of which only the part cooperating with the matching radial face 3 of the valve has been shown, has a raised radial face 37.

Obviously when the flange is tightly assembled, this raised face 37 must be applied on the radial face 3 of the valve, inducing a predefined compression ratio on cheek 11, 12 of sleeve 8. Therefore, to allow for different outer diameters of this raised face 37, diameter $D_2$ of the side of the groove is chosen smaller than any maximum outer diameter $D'_2$ of the raised surfaces 37 of the flanges liable to be used with the valve.

Of course, excepting the shape of cheeks 11, 12, the invention is not restricted to a particular shape of sleeve. For instance, as shown in FIG. 3, the core of the sleeve can also feature circular ribs 42 designed to fit in radial grooves 43 provided in bore 2 of body 1.

In addition to the measures described above, the outer shape of the valve body had to be reviewed in order to enable its assembly between all the types of flanges usually encountered internationally, while optimising the weight of the same body, and to allow downstream piping to be dismounted under maximum operating pressure at all connections (AFNOR, DIN, ISO, ANSI, JIS, BS).

It is a known fact that the number of flange/valve fastening points is a direct function of the stress imposed on the valve by the dismounting of the piping downstream, the stress being induced by:

the pressure of the fluid bearing on the closed stopper;

the compression of the sleeve cheek against the upstream flange, the weight of the valve and of its actuator.

The addition of these forces at maximum operating pressure yields the maximum stress which conditions the number and the size of these fixation points.

Following this procedure, maximum stress and the resulting minimum number of pins or screws required to maintain the valve on its upstream flange in full safety is defined for each valve diameter.

In fact, on a radial plane of the valve, the areas where pins or screws used for the different types of flanges applicable to each type of valve are located are all clustered together in well-defined areas, distinct from one another.

The invention therefore intends to take advantage of this feature with a view to defining flange/body fixation points.

To this effect bosses are provided on the perimeter of the valve body, of a block with the latter, designed to be drilled with the holes for pins or screws and with the following properties:

the number of bosses matches the minimum number of pins or screws required for the maximum stress as mentioned above, the position of these bosses matches the position of the predefined fixation points, each one of these bosses is large enough to encompass, in a radial plane of the valve, an area corresponding to a cluster of passage holes for the pins or screws used for the different types of flanges.

As an illustration, in FIGS. 1 and 2, only two cluster areas 38, 39 have been indicated, in the understanding that the other cluster areas are evenly laid out around the body 1 of the valve.

In both these figures, only two bosses have been shown, i.e.: one boss 40 next to the neck 5 of body 1 of the valve, and one boss 41 diametrically opposite.

Thereafter, to assemble the valve between two flanges of a specific type, all that remains to do is to drill a plain or tapped hole as required through the two bosses for the pins or screws, in suitable locations and sizes for the type of flanges involved.

More generally, the manufacture of valve bodies according to the invention involves the following phases:

the cluster areas of the projections on a radial plane of the holes of the different flanges liable to be used with the particular valve, superimposed coaxially, are defined for each range of valves, as defined by the valve nominal diameter.

The required and sufficient number of fixations that will enable the downstream piping to be dismounted under maximum operating pressure are defined by strength calculation applying conventional computing procedures.

On the basis of this calculated number and of the cluster areas, the shape and the location of the bosses to be provided on the body perimeter are assessed.

body 1 of the valve is manufactured, e.g. by casting, including the bosses defined above, and holes are drilled or tapped in these bosses to house the pins or screws in appropriate locations and dimensions to match the flanges specified in each case.

It is obvious that thanks to this procedure, only one valve body 1 shape need be provided for each valve range (nominal diameter), since this single valve body 1 can be used with any type of flanges applicable to the valve range, as described above.

As for the definition of the number of holes to be provided on the body 1 of the valve, and consequently the number of bosses, this definition can be done conveniently by means of the following Table, which gives the minimum number of bosses required to ensure mechanical withstand capability and upstream external tightness during downstream piping removal at maximum operating pressure as a function of the nominal diameter ND (in mm) of the valve.

TABLE

| ND | 32 to 125 | 150 to 250 | 300 to 450 | 500 to 600 |
|---|---|---|---|---|
| Minimum required bosses | 2 | 4 | 6 | 8 |

The numbers indicated in this table are given as an example for a maximum permissible pressure of 20 bars and for the standard screw sizes required by appropriate connection standards.

It should be noted that the layout of the fastening bosses must be designed carefully so that they will be able to withstand the considerable strain induced by the pressure in the upstream piping and transmitted to body 1 through operating shaft 7.

The number of bosses is always even, and they are evenly laid out about the operating axis, with the main bosses always next to the latter, i.e. joined to the neck 5 and to the bottom 56.

FIGS. 5 to 8 provide examples of valve body shapes for the previously indicated nominal diameters.

Figure 5:
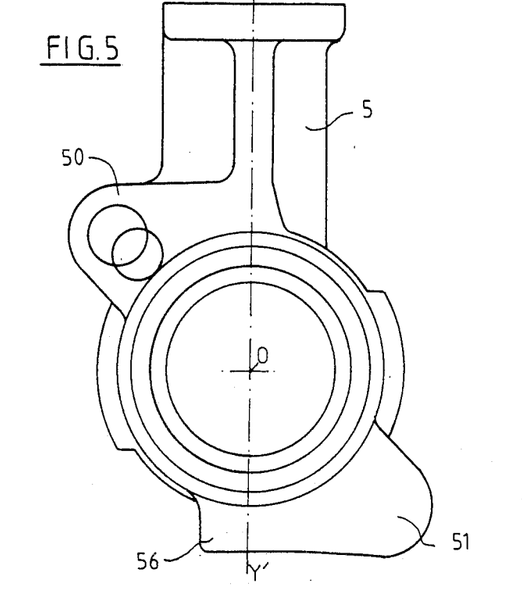
FIGS. 5 to 8 are front views of different valves, the bodies of which are shaped so as to offer a number of bosses which is just sufficient for the valve's nominal diameter and maximum permissible pressure.

FIG. 5 shows a valve body with a nominal diameter within the 32 to 125 mm range. This body is provided with two bosses 50-51, diametrically opposed and located practically at 45° from the axis YY' of the butterfly operating shaft. One of these bosses 50 is extended to join the neck 5 of the valve whereas the other boss is extended, symetrically referred to the center O of the valve, to the bottom 56.

Figure 6:
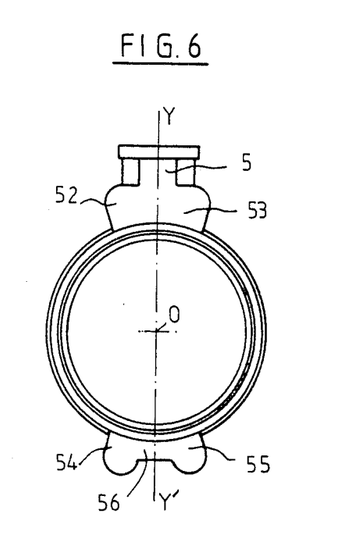

In the example illustrated in FIG. 6, which is rated in the 150 to 250 mm range, the valve has four bosses of which two, i.e. 52, 53 are attached to neck 5 and the other two, 54, 55 which are diametrically opposite 52, 53, are at either side of axis YY'. These two bosses 52, 53 are joined to the valve bottom 56.

Figure 7:
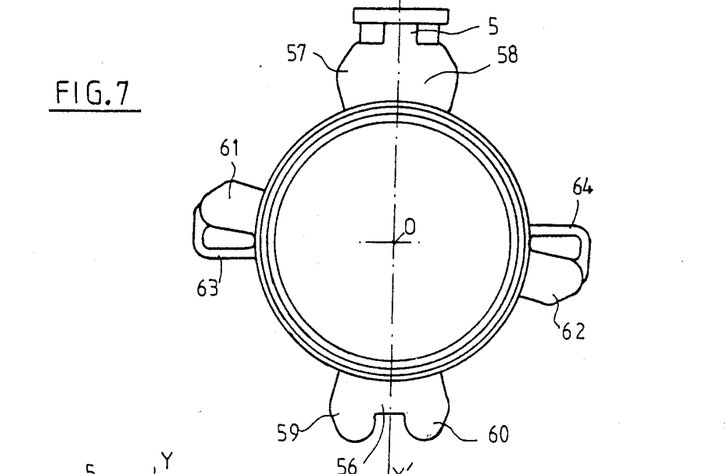

The valve shown in FIG. 7, belonging to the 300 to 450 mm range, has six bosses, i.e. four bosses 57 to 60 laid out similarly to bosses 52 to 55 in FIG. 6, and two bosses 61, 62 diametrically opposite each other near a ZZ' axis perpendicular to axis YY'. These two bosses are extended by a piece 63, 64, designed as a handle.

Figure 8:
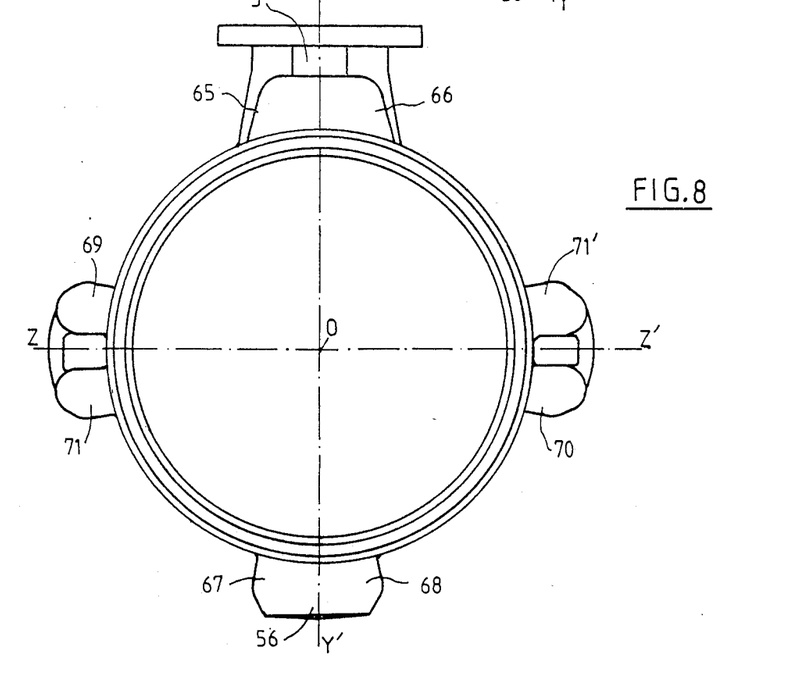

In the 500 to 600 mm range, as shown in FIG. 8, the valve can feature eight bosses, i.e.: six bosses 65 to 70 similar to bosses 57 to 62 in FIG. 7, and two bosses 71, 71' diametrically opposite each other, located symetrically to bosses 69, 70 about an axis ZZ' perpendicular to axis YY' and passing through the center O.

It should be noted that the bosses implemented following the invention may be plain and form a median rib. Or else they may be double and U-shaped, with both wings spreading in two lateral radial planes of the valve.

Of course, methods for removing downstream piping under operating pressure differ depending on the type of bosses used and on whether the holes required in the bosses are to be drilled or tapped.

Figure 9:
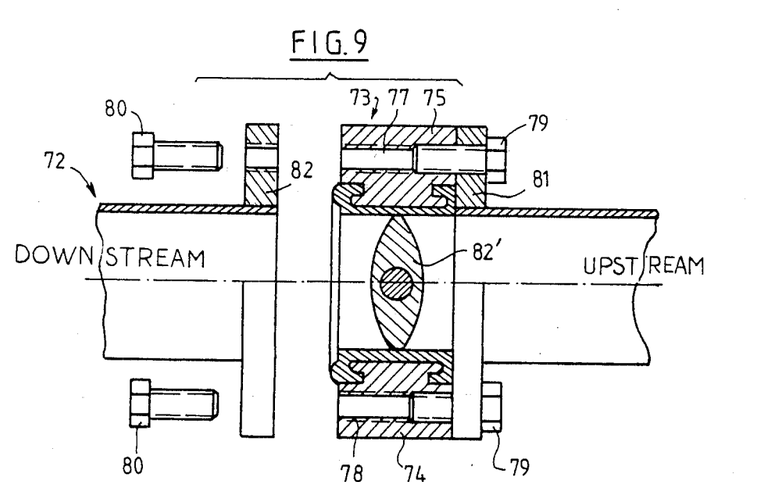
FIG. 9 is a schematic axial cross-section showing an example of a flange assembly of a valve on piping, and the method for in-service dismounting of the downstream piping.

FIG. 9 illustrates a method for dismounting the downstream piping 72 from a valve 73, the body of which has at least two bosses 74, 75, each with a tapped hole 77, 78.

In this example, each of these holes 77, 78, houses two screws 79, 80, retaining upstream and downstream flanges 81, 82 respectively.

In this case, downstream piping is dismounted under operating pressure simply by unscrewing screws 80 of the downstream flange, with the closing device 82' in the closed position and keeping the body of valve 73 fastened tightly to upstream flange 81.

In the case where the bosses are double with smooth holes, flanges are attached to the body by means of pins, each of which passes successively through a hole in the upstream flange, a matching hole drilled in the two wings of the boss, and a hole in the downstream flange. The seal is then ensured by means of two nuts screwed on the ends of the pin protruding from the upstream and downstream flanges.

In this case, dismounting the downstream piping under operating pressure may require successively for each pin:

removal of the downstream nut, displacement upstream of the pin, and screwing again of the downstream nut in the gap between the two wings of the boss.

Of course, other arrangements can be devised if necessary, particularly when downstream dismounting is liable to be frequent; these solutions may for instance use special flanges featuring tapped holes for pins and smooth holes for screws.

What is claimed is:

1. A butterfly valve comprising:
   (1) a body with a central bore having a first diameter (D), a transversal drilling at a right angle to said bore, at least a radial face extending in a first radial plane ($P_0$, $P'_0$) and in the center of which said bore opens, said radial face having a coaxial circular recess extending radially outwards from said bore, said body further comprising means for applying on said radial face a flange provided on a pipe, said flange having an inner diameter ($D'_1$), said means comprising a series of axial holes formed in a peripheral portion of the said body and pins which pass through said holes and connect to said flange;
   (2) a closing device assembled so as to rotate inside said body by means of an operating shaft inserted in said drilling;
   (3) an elastomer sleeve which comprises a tubular core having an inner surface, and at least a lateral cheek which partially fits into said circular recess;
   (4) said coaxial circular recess comprising successively:
      (a) a first flared portion (18) which extends in continuation of said bore (2) from a second radial plane ($P_1$ $P'_1$) which passes inside the body at a first distance $l_1$ from the first plane ($P_0$, $P'_0$) until an end portion (point B) which extends in a third radial plane ($P_2$, $P'_2$) located at a second distance $l_2$, smaller that the first instance $l_1$, said end portion having a second diameter $D_1$ greater than the diameter D of said bore;
      (b) a second section (19) substantially conical, receding towards the inside of the body from the end portion (point B) and ending at a fourth radial plane ($P_3$, $P'_3$) located at a third distance $l_3$ from said first plane ($P_0$, $P'_0$) greater than said second distance $l_2$;
      (c) a third section forming an annular groove extending axially towards the inside of the body, said groove comprising successively an inner cylindrical side (21) which extends axially n continuation of the second section, a plane radial bottom (22) and an outer cylindrical side (23) having a third diameter $D_2$ greater than the second diameter $D_1$; and
   (5) said lateral cheek comprising:
      (a) an inner face matching and always covering said first flared portion, said second portion and partially said third section, and an outer cylindrical edge (25) having a fourth external diameter $D_3$ smaller than said third diameter $D_2$, so that between said outer cylindrical side (23) and said outer edge (25), there remains an annular space volume v; and
      (b) an outer face comprising successively from said inner surface (28) of the sleeve:
         (i) a plane radial surface (27) extending in the first plane ($P_0$, $P'_0$) from said inner surface of said core and having a circular outer end, the diameter of which is equal to the second diameter $D_1$, said radial plane surface being connected to said inner surface (28) of the sleeve through a junction surface having an incurved profile; and
         (ii) a bulge (32) located opposite said second section (19) and the groove 20 and ending at the outer edge of the lateral cheek, said bulge 32 protuding axially beyond said first plane ($P_0$, $P'_0$) and having from said first plane ($P_0$, $P'_0$) a volume which is substantially equal to the spare volume v.

2. Valve as per claim 1, wherein the diameter, $D_1$ at the junction between the plane radial surface (27) and the bulge (32) on the cheeks is designed to be greater than the maximum inner diameter, $D'_1$ of the flange.

3. Valve as per claim 1, wherein the diameter $D_2$ of the aforementioned outer cylindrical side of the annular groove is smaller than the minimum outer diameter of the parts of the radial faces of the flanges that compress said lateral cheeks so as to make sure that these parts always abut against the radial face of the body of the valve.

4. Valve as per claim 1, wherein said second section (19) of the coaxial circular recess having a slope in relation to a centerline of the bore comprised between 10° and 40°.

5. Butterfly valve as per claim 1, wherein said flange has at least two matching holes, such that, in a radial plane of the valve, the passage areas of the pins assembled through the two holes of the flange cluster in at least two distinct areas around the body of the valve, and wherein there are at least two bosses on the perimeter of said body, each boss spreading over one of said cluster areas but not overlapping the passage areas of the pins assembled in the other holes of the flange.

6. Butterfly valve as per claim 1, wherein the number of bosses matches the minimum required number of pins to contain the stress withstood by the valve upon removal of the downstream piping at maximum operating pressure.

* * * * *